(12) United States Patent
Tseng et al.

(10) Patent No.: US 11,645,520 B2
(45) Date of Patent: May 9, 2023

(54) METHODS AND APPARATUSES FOR INFERENCING USING A NEURAL NETWORK

(71) Applicant: Nokia Technologies Oy, Espoo (FI)

(72) Inventors: Vincent Tseng, Cambridge (GB); Sourav Bhattacharya, Cambridge (GB); Nicholas D. Lane, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 216 days.

(21) Appl. No.: 16/769,416

(22) PCT Filed: Dec. 15, 2017

(86) PCT No.: PCT/EP2017/083005
§ 371 (c)(1),
(2) Date: Jun. 3, 2020

(87) PCT Pub. No.: WO2019/114982
PCT Pub. Date: Jun. 20, 2019

(65) Prior Publication Data
US 2020/0302292 A1 Sep. 24, 2020

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
CPC ............ G06N 3/049; G06N 3/02; G06N 3/08; G06N 20/00; G06N 3/088; G06N 5/022
See application file for complete search history.

(56) References Cited

U.S. PATENT DOCUMENTS 6,463,341 B1 10/2002 Cao et al.
8,417,715 B1 * 4/2013 Bruckhaus .............. G06F 17/30
707/758

(Continued)

OTHER PUBLICATIONS

Office action received for corresponding European Patent Application No. 17818533.6, dated Jul. 30, 2021, 8 pages.

(Continued)

*Primary Examiner* — Todd Buttram
(74) *Attorney, Agent, or Firm* — Mintz Levin Cohn Ferris Glovsky and Popeo, P.C.

(57) ABSTRACT

This specification describes methods for performing inferencing based on input data, the methods comprising: initialising a neural network based on a set of stored model information, which defines a plurality of orthogonal binary basis vectors which are to be used to implement kernels in one or more hidden layers of the neural network, and plural sets of plural coefficients, each set of plural coefficients corresponding to a respective one of the kernels, wherein each of the coefficients in a given set of coefficients is associated with a respective one of the one or more orthogonal binary basis vectors; passing input data through the neural network such that convolution operations between the kernels and data arriving at the kernels are performed, wherein each of the kernels is implemented using a respective set of coefficients and the orthogonal binary basis vectors with which the coefficients in the set are associated; and outputting data from the neural network, the output data representing an inference corresponding to the input data. The specification also describes methods for generating model information based on which neural networks may be initialised.

18 Claims, 4 Drawing Sheets

(56) References Cited

U.S. PATENT DOCUMENTS 9,563,825 B2 2/2017 Shen et al.
2017/0140260 A1* 5/2017 Manning .................. G06N 3/04

OTHER PUBLICATIONS

Courbariaux et al., "BinaryConnect: Training Deep Neural Networks with binary weights during propagations", arXiv, Apr. 18, 2016, pp. 1-9.
Rastegari et al., "XNOR-Net: ImageNet Classification Using Binary Convolutional Neural Networks", arXiv, Aug. 2, 2016, pp. 1-17.
Lane et al., "DeepX: A Software Accelerator for Low-power Deep Learning Inference on Mobile Devices", 15th ACM/IEEE International Conference on Information Processing in Sensor, Apr. 11-14, 2016, 12 pages.
Courbariaux et al., "Binarized Neural Networks: Training Neural Networks with Weights and Activations Constrained to +1 or −1", arXiv, Mar. 17, 2016, 11 pages.
Kim et al., "Compression of Deep Convolutional Neural Networks for Fast and Low Power Mobile Applications", arXiv, Feb. 24, 2016, pp. 1-16.
Han et al., "EIE: Efficient Inference Engine on Compressed Deep Neural Network", arXiv, May 3, 2016, 12 pages.
International Search Report and Written Opinion received for corresponding Patent Cooperation Treaty Application No. PCT/EP2017/083005, dated Sep. 5, 2018, 19 pages.
Lin et al., "Binarized Convolutional Neural Networks with Separable Filters for Efficient Hardware Acceleration", Jul. 15, 2017, pp. 1-9.
Bhattacharya et al., "Sparsification and Separation of Deep Learning Layers for Constrained Resource Inference on Wearables", Proceedings of the 14th ACM Conference on Embedded Network Sensor Systems CD-ROM, Nov. 14-16, 2016, 14 pages.
Lane et al., "Squeezing Deep Learning into Mobile and Embedded Device", IEEE Pervasive Computing, vol. 16, No. 3, 2017, pp. 82-88.

* cited by examiner

METHODS AND APPARATUSES FOR INFERENCING USING A NEURAL NETWORK

RELATED APPLICATION

This application claims priority to PCT Application No. PCT/EP2017/083005, filed on Dec. 15, 2017, which is incorporated herein by reference in its entirety.

FIELD

This specification relates to neural networks, particularly neural networks including one or more hidden layers, each implementing one or more convolution kernels.

BACKGROUND

Machine learning (ML) techniques using neural networks, such as artificial neural networks or deep neural networks, have been shown to be able to provide high prediction accuracy for various applications, such as image classification and speech recognition. However, most of the state-of-the-art neural network models are large and complex and require a huge amount of computational resources. This can make them unsuitable for deployment on resource-constrained devices, such as embedded systems and Internet of Things (IoT) devices (e.g. wearables, earbuds etc.).

As a consequence, numerous compression techniques for neural networks have been investigated. One of the more extreme compression techniques is model binarization, in which the weights in the model are represented using only one bit. While this technique can reduce the memory use of the model by 32 times, it may also cause the model to suffer a significant performance drop as a result of quantisation.

SUMMARY

In a first aspect this specification describes a method for performing inferencing based on input data. The method comprises initialising a neural network based on a set of stored model information, which defines a plurality of orthogonal binary basis vectors which are to be used to implement kernels in one or more hidden layers of the neural network, and plural sets of plural coefficients, each set of plural coefficients corresponding to a respective one of the kernels, wherein each of the coefficients in a given set of coefficients is associated with a respective one of the one or more orthogonal binary basis vectors. The method further comprises passing input data through the neural network such that convolution operations between the kernels and data arriving at the kernels are performed, wherein each of the kernels is implemented using a respective set of coefficients and the orthogonal binary basis vectors with which the coefficients in the set are associated. In addition, the method comprises outputting data from the neural network, the output data representing an inference corresponding to the input data.

Performing convolution operations between the kernels and the data arriving at the kernels may comprise, for each of the kernels: for each of the binary orthogonal basis vectors associated with the coefficients corresponding to the kernel, computing a binary convolution of the orthogonal binary basis vector and the data arriving at the kernel, and multiplying the binary convolution by the coefficient associated with the orthogonal binary basis vector; and adding the results of the multiplications to generate an output from the kernel.

Initialising the neural network may comprise, for each of the kernels, generating the kernel using the set of coefficients corresponding to that kernel and the associated orthogonal binary basis vectors. The method may comprise, for each of the kernels, generating the kernel by multiplying each binary basis vector with its associated coefficient and superimposing the results of the multiplications.

The method may comprise determining one or more performance requirements for the neural network; and based on the one or more performance requirements, selecting the set of stored model information from plural sets of stored model information, each corresponding to a different neural network model. The one or more performance requirements may include one or more computational resource constraints associated with a device which is to execute the neural network and/or an indication of an acceptable accuracy for the neural network. At least one of the one or more performance requirements may be determined based on a current usage by the device of one or more computational resources.

The method may comprise deterministically generating the orthogonal binary basis vectors required for the neural network based on identifiers in the set of stored model information. The method may further comprise deterministically generating the orthogonal binary basis vectors required for the neural network using dedicated hardware provided in a device which performs the inferencing.

The orthogonal binary basis vectors may be rows or columns of a Walsh Matrix.

The input data may be a representation of sensor data. The sensor data may be collected by at least one sensor that is provided in, or in communication with, the device which performs the inferencing. The sensor data may be audio data.

The set of stored model information may define a number of layers for the neural network and a number of kernels in each of the one or more hidden layers.

The method may further comprise: receiving input data at an input layer of the neural network; passing the input data through the neural network, such that convolution operations between the kernels and data arriving at the kernels are performed; and receiving the output data from an output layer of the neural network.

In a second aspect this specification describes method for generating at least one neural network model. The method comprises based on determined one or more performance requirements, determining at least one set of hyperparameters, each set of hyperparameters defining a different neural network model, wherein the hyperparameters in each set include a number of layers for the neural network, a number of kernels in each of the layers and a number of orthogonal binary basis vectors which are to be used to implement the kernels in each layer. The method further comprises, for each set of hyperparameters: initializing a respective neural network based on the set of hyperparameters; training the neural network using training data, thereby to learn a set of plural coefficients for each kernel, wherein each coefficient is associated with a respective one of the orthogonal binary basis vectors and wherein each of the kernels is implemented using a respective set of coefficients and the orthogonal binary basis vectors with which the coefficients in the set are associated; and storing the learned coefficients in association with the hyperparameters for provision to a user device.

The method of the second aspect may comprise, for each of the trained neural networks: using validation data to determine whether the trained neural network satisfies the at least one constraint indicated by the one or more performance requirements; and in response to determining that the trained neural network satisfies the at least one constraint indicated by the one or more performance requirements, providing the hyperparameters and the learned coefficients for storage on a user device. The method may further comprise based on the one or more performance requirements, determining plural sets of hyperparameters, each set of hyperparameters defining a different neural network model, initializing and training the neural networks defined by each set of hyperparameters, and providing plural sets of hyperparameters and corresponding learned coefficients for storage on a user device, wherein each of sets of hyper parameters that are provided for storage on the user device defines a neural network that has been determined to satisfy the one or more performance requirements.

Determining the at least one set of hyperparameters, each set of hyperparameters defining a different neural network may comprise determining, based on the one or more performance requirements, plural sets of hyperparameters, each set of hyperparameters defining a different neural network model.

The one or more performance requirements may include either or both of a minimum level of accuracy for the neural network, and a maximum level of computational resource use by the neural network. The maximum level of computational resource use by the neural network may be dependent on the user device, or class of the user device, by which the neural network is to be implemented. The maximum level of computational resource use by the neural network may comprise one or any combination of: CPU usage when executing the neural network, latency associated with the neural network, energy consumption resulting from executing the neural network, memory usage when executing the neural network, and memory usage required to store model information defining the neural network.

In a third aspect, this specification describes apparatus configured to perform a method according to the first aspect.

In a fourth aspect, this specification describes apparatus configured to perform a method according to the second aspect.

In a fifth aspect, this specification describes computer-readable instructions which, when executed by computing apparatus, causes the computing apparatus to perform a method according to the first aspect.

In a sixth aspect, this specification describes computer-readable instructions which, when executed by computing apparatus, causes the computing apparatus to perform a method according to the second aspect.

In a seventh aspect, this specification describes apparatus for performing inferencing based on input data, the apparatus comprising: means for initialising a neural network based on a set of stored model information, which defines a plurality of orthogonal binary basis vectors which are to be used to implement kernels in one or more hidden layers of the neural network, and plural sets of plural coefficients, each set of plural coefficients corresponding to a respective one of the kernels, wherein each of the coefficients in a given set of coefficients is associated with a respective one of the one or more orthogonal binary basis vectors; means for passing input data through the neural network such that convolution operations between the kernels and data arriving at the kernels are performed, wherein each of the kernels is implemented using a respective set of coefficients and the orthogonal binary basis vectors with which the coefficients in the set are associated; and means for outputting data from the neural network, the output data representing an inference corresponding to the input data. The apparatus of the seventh aspect may further comprise means for performing any of the operations described with reference to the first aspect.

In an eighth aspect, this specification describes apparatus for generating at least one neural network model, the apparatus comprising: means for determining, based on determined one or more performance requirements, at least one set of hyperparameters, each set of hyperparameters defining a different neural network model, wherein the hyperparameters in each set include a number of layers for the neural network, a number of kernels in each of the layers and a number of orthogonal binary basis vectors which are to be used to implement the kernels in each layer; and means for initializing, for each set of hyperparameters, a respective neural network based on the set of hyperparameters; means for training each of the initialised neural networks using training data, thereby to learn a set of plural coefficients for each kernel, wherein each coefficient is associated with a respective one of the orthogonal binary basis vectors and wherein each of the kernels is implemented using a respective set of coefficients and the orthogonal binary basis vectors with which the coefficients in the set are associated; and means for storing, for provision to a user device, the coefficients learned for each of the initialised neural networks in association with the hyperparameters for the network. The apparatus of, the eighth aspect may further comprise means for performing any of the operations described with reference to the second aspect.

In a ninth aspect this specification describes apparatus comprising: at least one processor; and at least one memory including computer program code which, when executed by the at least one processor, causes the apparatus to: initialise a neural network based on a set of stored model information, which defines a plurality of orthogonal binary basis vectors which are to be used to implement kernels in one or more hidden layers of the neural network, and plural sets of plural coefficients, each set of plural coefficients corresponding to a respective one of the kernels, wherein each of the coefficients in a given set of coefficients is associated with a respective one of the one or more orthogonal binary basis vectors; pass input data through the neural network such that convolution operations between the kernels and data arriving at the kernels are performed, wherein each of the kernels is implemented using a respective set of coefficients and the orthogonal binary basis vectors with which the coefficients in the set are associated; and output data from the neural network, the output data representing an inference corresponding to the input data. The computer program code of the apparatus of the ninth aspect may, when executed, cause the apparatus to perform any of the operations described with reference to the first aspect.

In a tenth aspect, this specification describes apparatus comprising: at least one processor; and at least one memory including computer program code which, when executed by the at least one processor, causes the apparatus to: based on determined one or more performance requirements, determine at least one set of hyperparameters, each set of hyperparameters defining a different neural network model, wherein the hyperparameters in each set include a number of layers for the neural network, a number of kernels in each of the layers and a number of orthogonal binary basis vectors which are to be used to implement the kernels in each layer; and for each set of hyperparameters: initialize a respective neural network based on the set of hyperparameters; train the neural network using training data, thereby to learn a set of plural coefficients for each kernel, wherein each coefficient is associated with a respective one of the orthogonal binary basis vectors and wherein each of the kernels is implemented using a respective set of coefficients and the orthogonal binary basis vectors with which the coefficients in the set are associated; and store the learned coefficients in association with the hyperparameters for provision to a user device. The computer program code of the apparatus of, the tenth aspect may, when executed, cause the apparatus to perform any of the operations described with reference the second aspect.

In an eleventh aspect, this specification describes a computer readable code, when executed by at least one processor, causing performance of: initialising a neural network based on a set of stored model information, which defines a plurality of orthogonal binary basis vectors which are to be used to implement kernels in one or more hidden layers of the neural network, and plural sets of plural coefficients, each set of plural coefficients corresponding to a respective one of the kernels, wherein each of the coefficients in a given set of coefficients is associated with a respective one of the one or more orthogonal binary basis vectors; passing input data through the neural network such that convolution operations between the kernels and data arriving at the kernels are performed, wherein each of the kernels is implemented using a respective set of coefficients and the orthogonal binary basis vectors with which the coefficients in the set are associated; and outputting data from the neural network, the output data representing an inference corresponding to the input data. The computer readable code of the apparatus of the eleventh aspect may, when executed, cause the apparatus to perform any of the operations described with reference to the first aspect.

In a twelfth aspect, this specification describes a computer-readable medium having computer-readable code stored thereon, the computer readable code, when executed by at least one processor, causing performance of: based on determined one or more performance requirements, determining at least one set of hyperparameters, each set of hyperparameters defining a different neural network model, wherein the hyperparameters in each set include a number of layers for the neural network, a number of kernels in each of the layers and a number of orthogonal binary basis vectors which are to be used to implement the kernels in each layer; and for each set of hyperparameters: initializing a respective neural network based on the set of hyperparameters; training the neural network using training data, thereby to learn a set of plural coefficients for each kernel, wherein each coefficient is associated with a respective one of the orthogonal binary basis vectors and wherein each of the kernels is implemented using a respective set of coefficients and the orthogonal binary basis vectors with which the coefficients in the set are associated; and storing the learned coefficients in association with the hyperparameters for provision to a user device. The computer readable code of the apparatus of the twelfth aspect may, when executed, cause the apparatus to perform any of the operations described with reference to the second aspect.

BRIEF DESCRIPTION OF THE FIGURES

For better understanding of the present application, reference will now be made, by way of example only, to the accompanying drawings in which.

DETAILED DESCRIPTION

Figure 1:
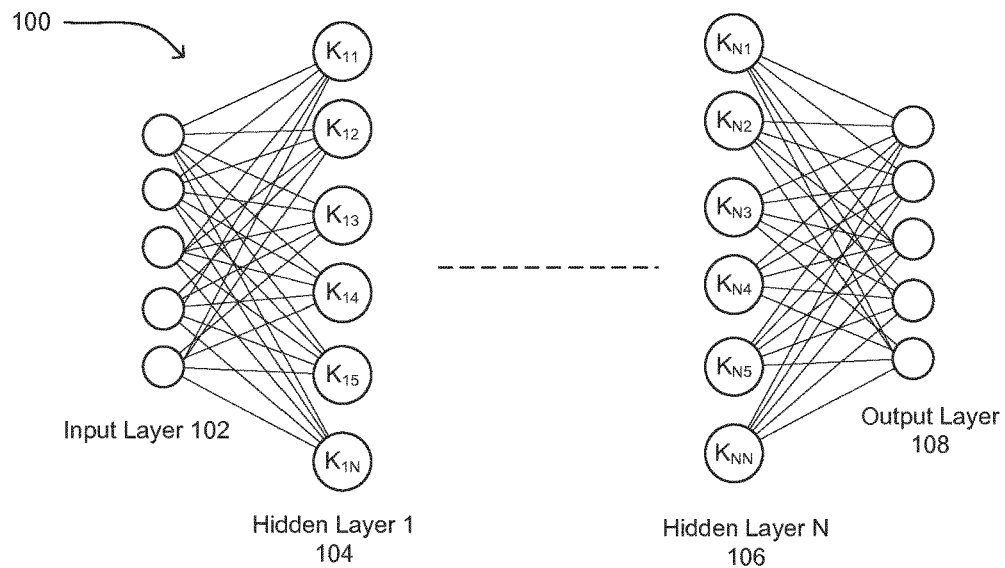
FIG. 1 is a schematic of a neural network, including at least one hidden layer which implements one or more convolution kernels.

In the description and drawings, like reference numerals refer to like elements throughout.

This specification describes a neural network having a small computational resource (e.g. memory, power and/or processing usage) footprint, while providing a high degree of inference accuracy. In addition, in some implementations, the neural network model may be generated and/or selected based on specific computational resource constraints. This may allow inference accuracy to be optimised while also satisfying the resource constraints. The specification also describes techniques which may be used to generate and/or prepare the neural network model for use on a resource constrained device.

FIG. 1 is a schematic illustration of a neural network. In the example of FIG. 1, the neural network 100 comprises an input layer 100, at least one hidden layer 104, 106, and an output layer 108. The neural network 100 is configured to receive input data at the input layer 102 and to process the data by passing it through the at least one hidden layer 104, 106. After processing by the at least one hidden layer, inference data is computed at the output layer 108. The output data is indicative of an inference made by the neural network 100 based on the input data. In one non-limiting example, when the input data is image data, the output data may indicative of a classification of the image. Other non-limiting examples of inferences which may be made by the neural network as described herein are discussed in more detail below.

Each of the hidden layers 104, 106 includes at least one kernel K. These one or more kernels K are for performing convolution operations on the input data arriving from the input layer, or on data passed from a previous hidden layer. One or more of the hidden layers in the neural network may be a fully connected layer. In addition or alternatively, one or more of the hidden layers may be a recurrent layer.

Each of the kernels may be implemented using a plurality of orthogonal binary basis vectors, each having an associated coefficient. Thus, in other words, each of the kernels may be implemented using a set of coefficients each of which is associated with a respective an orthogonal binary basis vector. More specifically, the kernel K may be represented using the superposition of the products of each binary basis vector with its associated coefficient. As such, the kernel K may be represented as follows:

$$K = c_1 b_1 + c_2 b_2 + c_3 b_3 + c_4 b_4 + \ldots + c_m b_m \qquad \text{Equation 1}$$

where: m is the number of orthogonal basis vectors used to represent the kernel;

$c_1$ to $c_m$ is the set of coefficients, and $b_1$ to $b_m$ is the set of orthogonal binary basis vectors.

By representing the kernels in the manner described above, a number of benefits may be obtained. These include:

1) Convolution operations may be accelerated by taking advantage of binary operations, including bit shifting, XNOR operations and bit counting (thereby reducing the number of computations that are required in order to perform the convolution operations);
2) Better accuracy may be obtained during inferencing, compared with previously published neural network models with having a similar model size, such as BinaryConnect (see "BinaryConnect: Training Deep Neural Networks with binary weights during propagations" by Matthieu Courbariaux, Yoshua Bengio, and Jean-Pierre David, arXiv:1511.00363);
3) The orthogonal binary basis vectors may be generated deterministically, meaning that they may be generated on-the-fly without needing to be stored in the memory (thereby significantly reducing the memory required for storing the orthogonal binary basis vectors);
4) Only the coefficients and identifiers for the binary basis vectors may need to be stored in order to generating the kernel (which again provides memory benefits); and
5) The accuracy of inferencing and/or use of computational resources may be selectively controlled by adjusting the number of orthogonal binary basis vectors that are used to represent the kernels.

As will be discussed in more detail below, each of the coefficients may have been determined during training of the neural network, in which the network may be trained while the kernels of the model are represented using orthogonal binary basis vectors and associated coefficients. This may contrast with techniques in which the kernels are determined during training using floating point notation and then are subsequently transformed such that they are represented using orthogonal binary basis vectors and associated coefficients. This means that binary operations may be utilised during training, thereby reducing the usage of processing resources during training.

Although not shown in FIG. 1, it will be appreciated that the neural network may, in some examples, include one or more pooling layer. Pooling layers may be configured to down-sample the data passing through the neural network. For instance, down-sampling may be achieved by finding the maximum, minimum or average value within the neighbourhood of each data value and passing only the maximum, minimum or average value on to the next layer.

Figure 2:
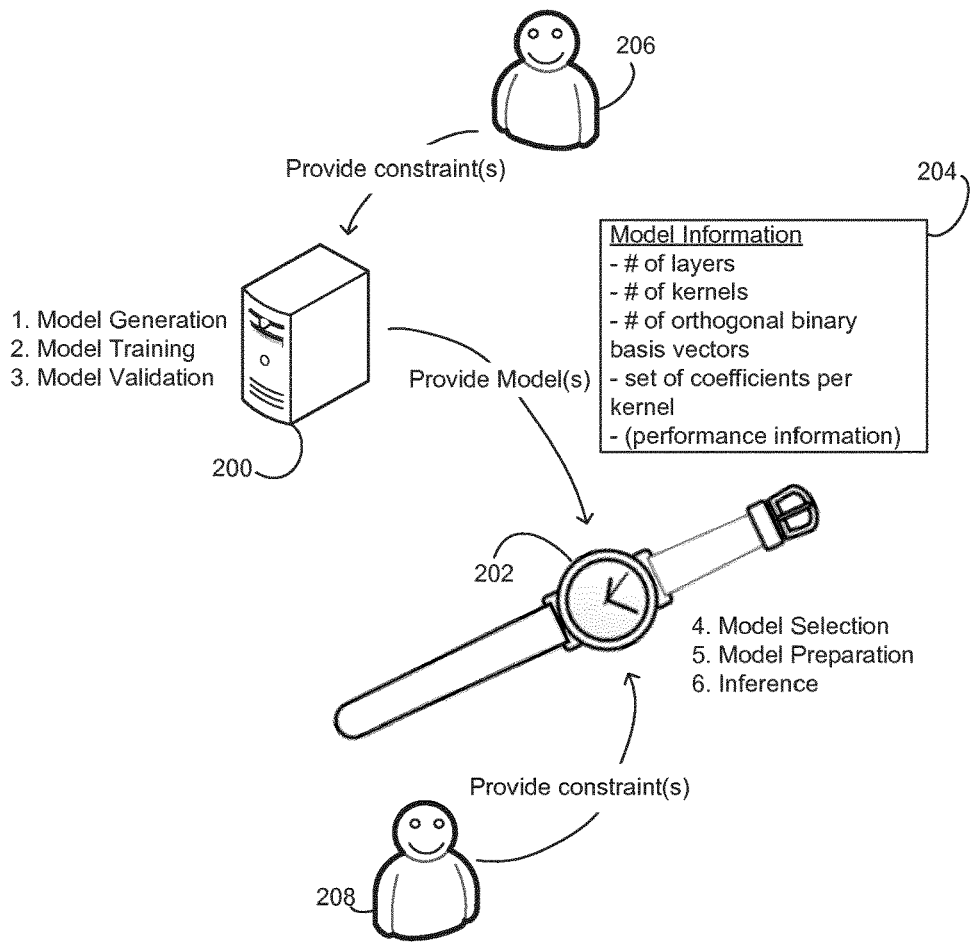
FIG. 2 is an example of a system within the context of which various operations described herein may be performed.

FIG. 2 illustrates an example of a system in which a neural network may be generated and implemented. The Figure also illustrates various processes which may be performed in order to generate and implement the neural network.

FIG. 2 shows neural network training apparatus 200 and a user device 202. The network training apparatus 200 may be, for instance, one or more server computers or a user terminal such as a personal computer. The user device 202 may be resource-constrained in the sense that it has limited processing, battery and/or memory resources. The user device 202 may be, for instance but not limited to, a wearable device, an embedded device (such as a single-board computer or a microcontroller), or a peripheral device (e.g. earbuds, headphones, earphones, etc.). In the example of FIG. 2, the user device 202 is a smartwatch. In some examples, the user device 202, regardless of the form factor, may be an IoT device, a sensor device (such as a heart rate sensor, a motion sensor, a radar), a pacemaker, a ring device, an ear leaf device, a network communication node, a still or video camera, a navigation device, a music or video player, an in-vehicle infotainment device, an in-vehicle telematics device, a drone, and an unmanned aerial vehicle (UAV), or in any combination thereof. In one example of the system, the neural network training apparatus 200 may be embedded in the user device 202. In another example of the system the neural network training apparatus 200 may be embedded in a vehicle or a mobile communication device (such as a mobile phone).

As illustrated in FIG. 2, the neural network training apparatus 200 may perform model generation, model training and model validation. The neural network training apparatus 200 may then provide model information 204 defining one or more models to the user device for storage. The model information 204 may define parameters of the model. The parameters may include hyperparameters for the model such as a number of layers in the model, a number of kernels in each of the layers, identifiers of the orthogonal binary basis vectors used to represent the kernels, or any combination thereof. In addition, the parameters may include a set of coefficients for each kernel. In some examples, the model information may also include information describing the performance of the model, such as accuracy and/or computational resource use.

The user device 202 may use the model information 204 to perform model preparation and inferencing. In some examples, the user device may also perform model selection.

As will be explained in more detail below, the model generation and/or model validation may take into account one or more requirements relating to performance of the neural network (hereafter "performance requirement information"). This performance requirement information may be dependent upon the user device 202 for which the neural network is intended, and/or a purpose for which the neural network will be used. For instance, the performance requirement information may include a minimum acceptable accuracy and/or a maximum tolerable resource usage level. In some examples, the minimum acceptable accuracy may be dependent on the purpose for which the neural network will be used. Similarly, the maximum tolerable resource usage level may be dependent on the resources available on the user device 202. The performance requirement information may be provided to the neural network training apparatus by a user 206, for instance, an engineer developer responsible for generating the neural network model. In other examples, the performance requirement information may be determined and/or provided to the neural network training apparatus 200 by an application in the user device 202, for instance, the application that will implement the model information 204 in a computation. In another example, the performance requirement information may be determined and/or provided to the neural network training apparatus 200 by another application in the user device 202, that for instance, manages and/or monitors computational resource in the user device 202.

As will also be explained in more detail below, model selection at the user device 202 may also take into account performance requirement information. The performance requirement information may again relate to accuracy and/or computational resource use and may, for instance, be determined and/or provided by the user device 202, and/or determined and/or provided by the end user 208 of the user device 202.

Various operations which may be performed by the user device 202 will now be described with reference to the flow chart of FIG. 3. Although the operations illustrated in FIG. 3 may be described as being performed by the user device 202, it will be appreciated that these operations may fact performed by processing apparatus of, or for, the user device 202.

Model Selection

In operation S3-1, the user device 202, for example by utilizing a specific application, may determine the computational resource constraints of the device. This may be based on a current state and/or contexts of the device, and/or future estimated state and/or context of the device, which may be dynamic. For instance, the computational resource constraints may be determined based on, or relating to, one or more of current CPU (Central processing Unit) load, current memory load, current power consumption, and/or remaining battery. In other examples, at least some of the device constraints may be determined based on, or relating to, static characteristics of the device, e.g. processing power and total memory. In other examples, at least some of the device constraints may be determined based on, or relating to, future estimated characteristics of the device, such as one or more of CPU load, memory load, power consumption, and/or battery life. Still in other examples, at least some of the device constraints may be determined based on, or relating to, current and/or future estimated context of the device, such as a location of the device, motion of the device, state of the device, placement of the device, etc. or any combination thereof.

In operation S3-2, the user device 202, for example by utilizing the specific application, may select a neural network model from a plurality of neural network models locally stored on the device 202. The plurality of neural network models may be referred to as a candidate list and may have been received from the neural network training apparatus 200. This selection may be based on the computational resource constraints of the device 202. The user device 202, for example by utilizing the specific application, may select the neural network model which satisfies the computational resource constraints of the device, and which provides the highest accuracy. In some examples, the specific application may be an application that will implement the model information 204 in a computation, and/or or an application that manages and/or monitors computational resource in the user device 202.

As described above, the model information 204 describing each of the neural network models may include performance information (which may include, for instance, memory usage and/or CPU usage by the neural network, when implemented), and the computational resource constraints (either dynamic or static) may be compared with the performance information to select a neural network model which satisfies the resource constraints of the device. In this way, if, for example, the current load on the CPU and/or memory of the device 202 is particularly high, a neural network model which utilises less CPU and/or memory may be selected. In addition, the performance information may include an indication of the accuracy of the model, as determined during validation. As such, if there are plural different models which satisfy the resource constraints, the model having the highest accuracy may be selected.

In operation S3-3, the user device 202 may provide, for example by utilizing the specific application, an indication to the user, and/or the application that will implement the model information 204 in the computation, of the accuracy that will be provided by the currently selected model. In addition or alternatively, the user device 202 may provide an indication of computational resources that will be used by the currently selected model. As mentioned above, the accuracy of the currently selected model may be included in the performance information, which forms part of the model information 204. The indication of computational resources that may be used may also be selected based on the performance information and/or may be generated on-the-fly. For instance, based on the model information, the number of computations that will be performed by the neural network, when executed, may be determined. This may then be used to determine, based on a current load of the CPU, how long it will take to receive an inference based on input data. Based on this, battery power required to execute a neural network, in accordance with the currently selected neural network model, may be determined.

The user device 202 may also provide the user, and/or the application that will implement the model information 204 in the computation, with an option to adjust the accuracy and/or the computational resource use that they are prepared to accept. For instance, if the user, or the application, provides an input indicating that they would prefer to a lower computational resource usage, a different neural network model, which will use fewer computational resources (but will also provide a lower accuracy), may be selected. Similarly, if the user, and/or the application, decides that they can tolerate lower accuracy, a neural network model which provides lower accuracy, and which also uses fewer computational resources, may be selected.

As such, in operation S3-4, the user device 202 may determine whether an input indicating that the user wishes, and/or the application to adjust the accuracy and/or computational resource use has been received.

If no user input has been received, the user device 202 may proceed to operation S3-6. Alternatively, if an input has been received, the user device 202 may, in operation S3-5, select a new neural network model, having different parameters, from the candidate list. After operation S3-5, the user device 202 may either return to operation S3-3 or proceed to operation S3-6.

Model Preparation

In operation S3-6, the user device 202, for example by using a neural network initialization application or module, may initialise a neural network, in accordance with the parameters defined by the neural network model information for the selected neural network model.

In some examples, the initialisation of the neural network may include generation of the orthogonal binary basis vectors in operation S3-6a. The neural network model information may include identifiers for the orthogonal binary basis vectors and these may be generated accordingly. For instance, the identifiers may identify rows or columns from a Walsh matrix, which is a matrix in which all rows are orthogonal to all other rows, and all columns are orthogonal to all other columns.

The orthogonal binary basis vectors may be generated when required and, in some examples, may be generated by a dedicated hardware device. Use of dedicated hardware to generate the orthogonal binary basis vectors may speed up the generation process and also reduce energy footprint. For instance, it may allow parallelisation.

In other examples, the orthogonal binary basis vectors may be stored as part of the neural network model information. However, this may have the effect of increasing the memory footprint of the model information, which may not be desirable.

As discussed above, each of the kernels in the neural network may be represented by the orthogonal binary basis vectors and their associated coefficients, for instance, as explained with reference to Equation 1. One or more of the kernels may be represented by plural orthogonal binary basis vectors and plural associated coefficients. In some examples, all of the kernels in each layer of the neural network may utilise the same set of orthogonal binary basis vectors, but with each kernel having a different set of coefficients.

In some examples, the binary basis vectors and the coefficients may be used directly when performing convolution operations in respect of the input data. This will be described more detail below. However, in other examples, the kernels may be generated as part of the initialisation process based on the orthogonal binary basis vectors and the associated coefficients for the kernel. More specifically, each of the kernels may be generated by multiplying each of the one or more binary basis vectors with the corresponding coefficients and superimposing the results of the multiplications to generate the kernel. However, by generating the kernels during initialisation, rather than using the binary basis vectors and coefficients directly when performing convolution, additional processing may be required when performing the convolutions since it is not possible to take advantage of binary operations.

Inferencing

In operation S3-7, the user device 202, for example by using a data pre-processing application or module, may pre-process the input data prior to provision to the input layer of the neural network. The nature of the pre-processing may depend on the nature of the input data. For instance, in examples in which the input data is not two-dimensional data, pre-processing may comprise converting the input data into a two-dimensional representation. For instance, in the case of audio data or any other wave form data (such as radio signal transmission, ECG (Electrocardiography), EEG (Electroencephalography), motion sensor data, etc.), a two-dimensional spectrogram may be generated based on the input data. The conversion of the data into a two-dimensional representation may be required before the neural network is able to process the data.

Regardless of the nature of the input data, in some examples, pre-processing may also include binarization of the input data (or the pre-processed input data, where appropriate). Binarization of the input data may be carried out in any suitable way. For instance, binarization may be performed by taking the sign of the floating-point values of the input data and then multiplying by a suitable constant. In some examples, orthogonal binary vectors may be used to represent the input data. For instance, the input data may be represented by one or more orthogonal binary basis vectors and corresponding coefficients. Another way in which binarization of input data may be performed is as described in "XNOR-Net: ImageNet Classification Using Binary Convolutional Neural Networks" by Mohammad Rastegari, Vicente Ordonez, Joseph Redmon, and Ali Farhadi (https://arxiv.org/pdf/1603.05279.pdf). In this approach, the input data is represented using a coefficient and thresholded values. The coefficient can be computed by taking the L1-norm of the input data and dividing by its length. The thresholded values can be obtained by choosing, for instance, zero as the threshold, in which case values greater or equal to zero will become one and values less than zero will become minus one. Binarization of the input data may simplify the convolution operations performed using the kernels, thereby further reducing the computational resource use required to implement the neural network.

In operation S3-8, the (pre-processed) input data is received at the input layer of the neural network.

In operation S3-9, the data is passed from the input layer through the one or more hidden layers. At each of the hidden layers, convolution operations are performed in accordance with the kernels of that layer. As mentioned above, the kernels may be implemented using the sets of orthogonal binary basis vectors and a set of coefficients defined for that kernel. Most specifically, convolution operations corresponding to each of the kernels may be performed by first computing, for each of the binary orthogonal basis vectors corresponding to the kernel, a binary convolution of data arriving at the kernel with the orthogonal binary basis vector and multiplying the binary convolution by the respective coefficient associated with the orthogonal binary basis vector. Subsequently, the results of the multiplications may be summed to generate an output from the kernel.

In this way, the hidden layers may perform end-to-end binary convolution, through all the hidden layers in the neural network, based on the input data arriving at the input layer.

Finally, in operation S3-10, output data is received from at the output layer of the neural network. The output data may be indicative of an inference that has been made by the neural network based on the input data.

As will be appreciated by the skilled person, neural networks as described herein, and the process described with reference to FIGS. 2 and 3, may enable neural networks to be implemented on resource constrained devices. Moreover, in some examples, a suitable neural network model may be selected based on the current resource constraints on the user device 202, which may thereby ensure that execution of the neural network does not affect the operation of the user device too adversely, while at the same time providing the highest possible accuracy that the current resource constraints allow.

Figure 3:
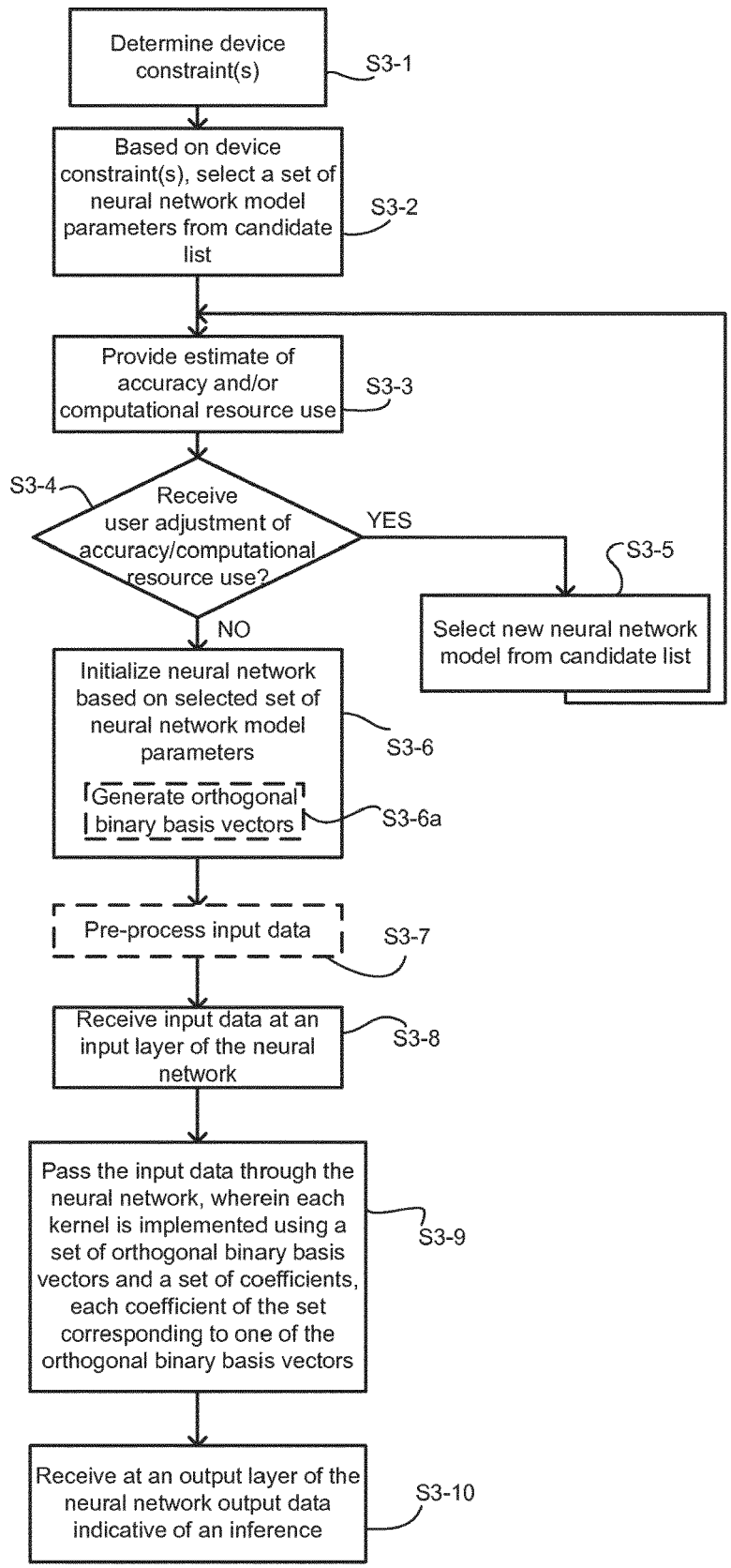
FIG. 3 is a flowchart showing various operations which may be performed by a device implementing a neural network.

As will be appreciated by the skilled person, the operations depicted in FIG. 3 may be performed in a different order and/or concurrently. Also, some of the operations may be omitted. For instance, in some examples, model information representing only a single model (and not a candidate list, including plural sets of model information) may be stored on the user device 202. In such examples, operations such as S3-1 to S3-5 may be omitted. In addition or alternatively, operations, S3-6a and S3-7 may be omitted.

Figure 4:
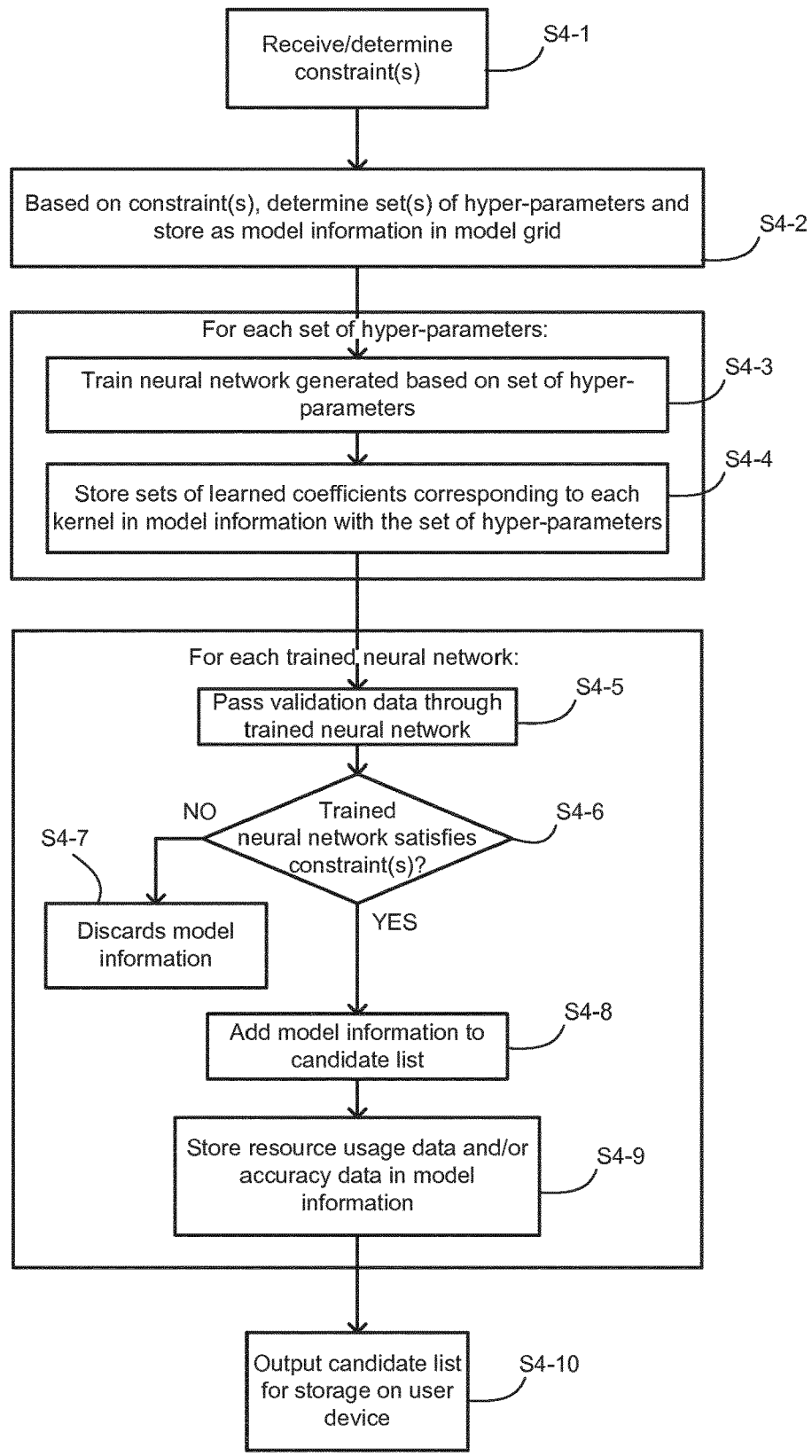
FIG. 4 is a flowchart showing various operations which may be performed by an apparatus for training a neural network.

Various operations which may be performed by the neural network training apparatus 200 will now be described with reference to the flow chart of FIG. 4. More specially, FIG. 4 shows various operations via which neural networks described with reference to FIGS. 1 to 3 might be generated, trained and validated prior to use by user device 202.

Model Generation

In operation S4-1, the apparatus 200 may receive information indicative of one or more constraints for the neural network model. These constraints may include a maximum tolerable computational resource use and/or a minimum acceptable accuracy for the model and/or a maximum acceptable latency. The constraint on computational resources may, for instance, include constraints on one or more of CPU usage, memory required to store and/or execute the neural network model and energy consumption/battery usage.

The information indicative of constraints may be determined and/or provided by a user 206 and/or the user device 202, for example by utilizing a specific application. In some examples, the received information may identify a particular device or class of devices for which the model is intended, and the constraint on computational resource use may be derived from this, for instance, using a lookup table which includes specifications for specific devices or classes of device. Similarly, the received information may identify a particular implementation or class implementations for the neural network model, and the apparatus 200 may identify the minimum acceptable accuracy based on the implementation or class of implementations (e.g. using a lookup table). In other examples, the one or more constraints may be specified by the user directly, for instance via a graphical user interface (GUI). In some examples, the specific application may be an application for which the model is intended, and/or or an application that manages and/or monitors computational resource of the user device 202.

In operation S4-2, the apparatus 200 determines at least one set of hyperparameters for a neural network model. These hyperparameters include the number of layers in the neural network model, the number of kernels in each layer, and a number of orthogonal binary basis vectors in each layer. The hyperparameters may be determined on the basis of the computational resource constraints. For instance, the constraint may indicate a maximum memory that is allowed to be used to store the neural network model, a maximum CPU usage and/or a maximum latency. The number of layers, the number of kernels in each layer, and the number of orthogonal binary basis vectors per layer can then be selected so as to satisfy the memory constraint. In addition, it is possible to determine the number of computations performed by the neural network based on the number of layers, the number of kernels in each layer, and the number of orthogonal binary basis vectors. As such, the hyperparameters can be selected so as to also satisfy the CPU usage constraint. Similarly, if the type of the processor on the user device 202 is known, the number of computations may be used to determine the time required to pass data through the neural network (which is an indication of the latency).

In some implementations, the apparatus 200 determines plural different sets of hyperparameters, all of which is satisfy the imposed constraints. The different sets of hyperparameters may be referred to as sets of neural network model information. They may be stored in memory in a "model grid".

Model Training

Subsequently, in operation S4-3, one or more neural networks based on each of the sets of hyperparameters are trained. The training data may be retrieved from a larger set of data (labelled examples) from which some of the data is used as training examples for training the neural network models and other data of the set is used as validation examples, for validating trained neural network models.

In some examples, the apparatus 200 selects the sets of hyperparameters from the model grid iteratively, and trains a neural network based on each set of hyperparameters in turn. In other examples, two or more of the neural networks may be trained concurrently.

During training, the kernels in each of the layers are implemented using superposition of the products of the binary basis vectors and corresponding coefficients. The coefficients for each of the kernels may be initiated randomly or in any other suitable way. The coefficients are then updated/refined during training using gradient descent and back propagation. In some examples, stochastic gradient descent may be used.

Once a local minimum has been found and/or a maximum number of iterations have been performed, the coefficients are (in operation S4-4) stored in the appropriate set of neural network model information along with the corresponding hyperparameters. The coefficients may be stored in sets, each corresponding to a different kernel. Each of the coefficients may also be stored in a manner which allows the corresponding orthogonal binary basis vector to be identified. For instance, each coefficient may be stored in association with an identifier of the associated orthogonal binary basis vector.

Model Validation

In operation S4-5, the validation data is passed through each of the trained neural networks. The validation may in, some examples, be performed iteratively (i.e. one trained neural network at a time). Latency may also be monitored.

Validation may allow the apparatus 200 to determine the accuracy of the model. (since the validation examples are labelled). In addition, the apparatus 200 may monitor the computational resource use during validation. The monitored computational resource use may include energy consumption, CPU usage and memory used to execute the neural network model.

Subsequently, in operation S4-6, the apparatus 200 determines whether each of the trained neural networks satisfies the one or more imposed constraints (e.g. those received/determined in operation S4-1), e.g. comparing the monitored computational resource use with the one or more imposed constraints. For instance, the apparatus 200 may determine whether the accuracy of the trained neural network satisfies the minimum acceptable accuracy constraint and/or whether the computational resource usage of the trained neural network satisfies the computational resource constraint.

In response to determining that the trained neural network does not satisfy the one or more constraints, the apparatus 200 (in operation S4-7), may discard the model information corresponding to that trained neural network.

In response to determining that the trained neural network does satisfy the one or more constraints, the apparatus 200 (in operation S4-8) may add the model information corresponding to that trained neural network to a candidate list. The candidate list may include model information for trained neural network models that satisfy the imposed constraints.

In operation S4-9, the computational resource usage data and/or the accuracy data, both of which may be determined during validation, may be added to the model information for the corresponding neural network model. This may be performed before or after the model information is added to the candidate list.

Subsequently, once all of the trained neural networks have been validated and the candidate list is complete, the apparatus 200 may output the candidate list for storage on the user device. In some instances, the candidate list may be provided directly to the user device 202, while in other examples, the candidate list may be stored and provided to the user device 202 at a later, suitable point in time.

As will be appreciated by the skilled person, the operations depicted in FIG. 4 may be slightly different and/or may be performed in a different order and/or concurrently. Also, some of the operations may be omitted. For instance, in some examples, only a single set of model information may be provided to the user device 202. The set of model information that is provided may be that which provides the highest accuracy complying with any constraints on use of computational resources.

Example Implementations

The techniques described herein may be applicable to many different types of input data, including but not limited to, image data, audio data, video data, gyroscope and/or accelerometer data, electric current sensor data (which may, for instance, be indicative of electrical signals generated by the human body, e.g. by the human heart), and light sensor data (e.g. as might be generated by a wrist-based heart monitor). Indeed, the techniques described herein may be applicable to any form of digital data that can be represented as a data matrix. It will thus be appreciated that the described techniques are, therefore, not limited to any one particular implementation.

The input data may be collected by one or more sensors provided in, or in association with, the user device 202 which implements the neural network. Such sensors may include but are not limited to image sensors, light sensors, microphones, electrodes, gyroscopes and accelerometers.

In one non-limiting example, the neural network may be implemented in an in-ear wearable apparatus, which includes one or more microphones for detecting audio data, such as utterances spoken by the user. The neural network may be trained so as to infer, based on the input audio data, the stress level of the user. As mentioned above, the neural network audio data may be pre-processed into a two-dimensional representation prior to provision to the neural network. Also, in some examples, the input data may also be binarized.

In another non-limiting example, the neural network may be implemented in a wearable such as a wrist worn device, which includes an accelerometer and/or a gyroscope for detecting movement of the user. In such examples, the neural network may be trained so as to infer the nature of the detected movements, based on signals received from the accelerometer and/or a gyroscope.

In another non-limiting example, the neural network may be implemented in a pacemaker device and may be trained to infer heart function based on signals detected by the electrodes/sensors of the pacemaker device.

In another non-limiting example, the neural network may be implemented in a wrist-worn heart monitoring device and may be trained to infer heart function based on signals detected by the light sensor of the device.

In another non-limiting example, the neural network may be implemented in a set of weighing scales and may be trained to infer health information based on, for instance, data derived from electrodes upon which the user stands.

In another non-limiting example of the system, the neural network training apparatus 200 may be embedded in the user device 202, such as a mobile communication device or a mobile phone, that is further connected via a wireless radio connection to a sensor device having a wireless radio transceiver. The sensor device may include, for instance, a heart rate detection and/or analysis device, a motion/acceleration device, a location detection device, a blood sugar level analysis device, a blood pressure detection analysis device, a pacemaker, or any combination of aforementioned. The sensor device can be, for example, attached to a human or animal body or placed inside of the body. In this example the training apparatus may control and instruct the sensor device and provide one or more models to it. Further, the training apparatus may receive analysis information from the sensor device based on the provided model, and may also receive raw sensor data for the sensor device. The analysis information and/or the raw sensor data maybe further used in the training apparatus for developing and training machine learning models, such as artificial neural network models. In another relating but non-limiting example, the sensor device may be an IoT sensor device that is attached to any physical object, such as a parcel, a luggage, a machine, etc., to monitor the function of the object and/or environment of the object, and provide related analysis information.

In another related but non-limiting example, the mobile communication device or the mobile phone can alternatively or further operate between an external neural network training apparatus 200 and an external sensor device 202 and wirelessly transmit one or more models, data and/or analysis between them.

Example Physical Configurations of Computing Apparatuses

Figure 5:
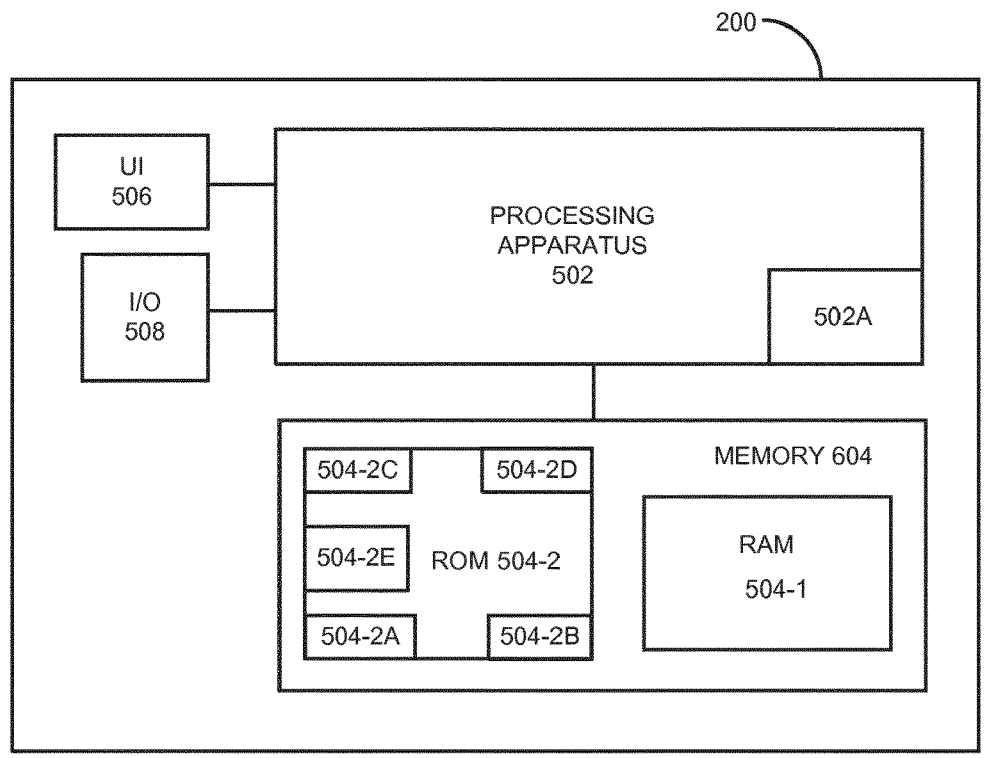
FIG. 5 is a schematic illustration of an example hardware configuration of an apparatus for training the neural network.

FIG. 5 is a schematic illustration of an example configuration of neural network training apparatus 200 described with reference to FIGS. 1 to 4. As will of course be appreciated, the neural network training apparatus 200 may include various elements which are not illustrated in FIG. 5.

The neural network training apparatus 200 comprises processing apparatus 502 communicatively coupled with memory 504. Computer-readable code 504-2A, for is causing the initialising, training, validation of neural networks (and any other operations described above with reference to the neural network training apparatus 200) may be stored on the memory 504. When executed by the processing apparatus 502, the code 504-2A may cause the processing apparatus 502 to perform any of the operations described above with reference to the neural network training apparatus 200. The memory 504 may also store one or more of the model grid 504-2B, the candidate list 504-2C, the training data 504-2D and the validation data 504-2E.

In some examples, the neural network training apparatus 200 may also comprise a user interface 506, via which the user may provide performance requirement information.

The neural network training apparatus 200 may comprise an input output interface 508 via which data can be received and transmitted, for instance via a network. In some examples, the performance requirement information may be received from a client computer over a network via the input output interface 508. Similarly, the training data 502-2D and/or the validation data 502-2D may be received via the input output interface 508.

In some examples, the candidate list 504-2C may be provided to the user device 202 via the input output interface 508.

Figure 6:
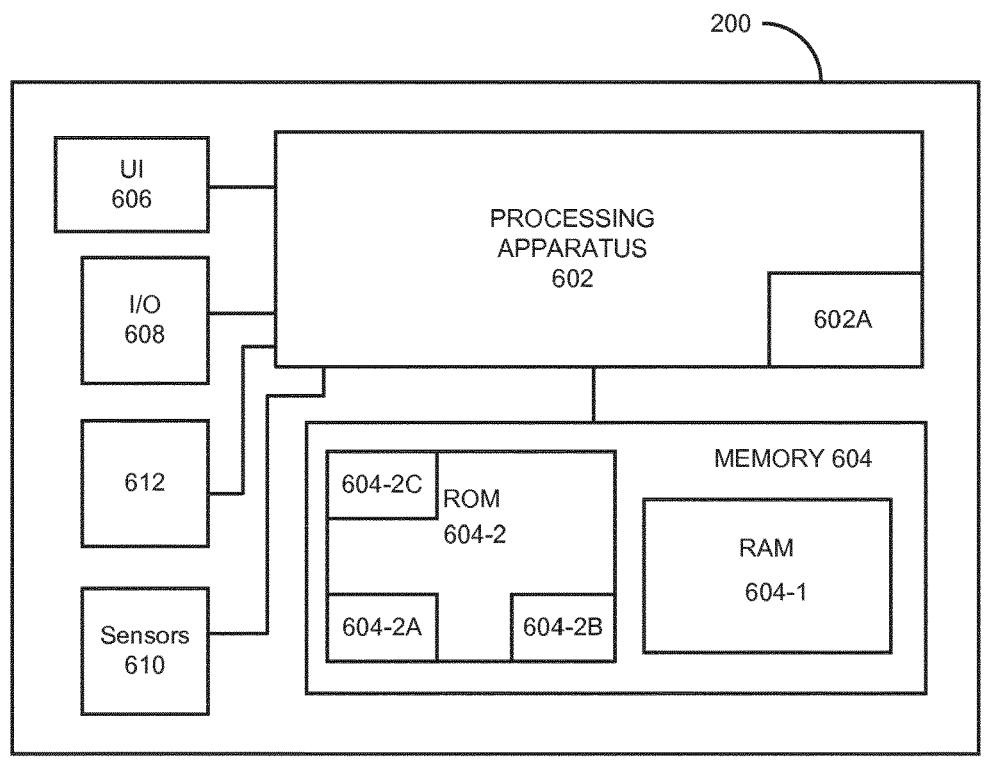
FIG. 6 is a schematic illustration of an example hardware configuration of a device for implementing a neural network.

FIG. 6 is a schematic illustration of an example configuration of user device 202 described with reference to FIGS. 1 to 4. As will of course be appreciated, the user device 202 may also include various elements which are not illustrated in FIG. 6. In addition or alternatively, one or more of the elements which are depicted may be omitted.

The user device 202 comprises processing apparatus 602 communicatively coupled with memory 604. Computer-readable code 604-2A for implementing a neural network as described above (and for causing performance of any other operations described above with reference to the 200) may be stored on the memory 604. When executed by the processing apparatus 602, the code 604-2A may cause the processing apparatus 602 to perform any of the operations described above with reference to the neural network training apparatus 200. The memory 604 may also store the candidate list 604-2B. The memory 604 may also include one or more memory portions 604-2 for storing input data prior to provision to the neural network.

The computer-readable code 604-2A may be in the form of one or more applications and/or an operating system. For instance, the computer-readable code 604-2A may include the one or more applications described above with reference to FIGS. 2 and 3.

In some examples, the user device 202 may also comprise a user interface 606, via which information may be displayed to the user and via which the user may provide inputs (e.g. performance requirement information) to the user device 202.

The user device 202 may comprise an input-output interface 608 via which data can be received and transmitted to and from other devices (either directly or via a network). For instance, the candidate list 604-2B (or model information relating to a single model) may be received directly or indirectly from the neural network training apparatus 200 via the input output interface 608. For instance, the candidate list/model information may be provided as part of an update to the operating system used by the device 202 or a particular application stored on the device, which implements the neural network. In other examples, the candidate list/model information may be pre-loaded into the device 202.

The user device may also include one or more sensors 610 for generating the input data. Such sensors may include but are not limited to any combination of: one or more image sensors (e.g. still and/or video cameras), light sensors, LIDAR (Light Detection and Ranging) sensor, a RADAR sensor, a GNSS (Global Navigation Satellite System) sensor (e.g. a GPS (Global Position System) or GLONASS module), microphones, electrodes, barometers, thermometers, digital compasses, gyroscopes and accelerometers. In other examples, the user device 202 may receive the sensor data via the input output interface 608 from one or more sensors that are separate from the user device. For instance, sensor data may be received over a Bluetooth connection between the user device 202 and a device in which the sensor is provided.

The user device may also include a dedicated hardware component 612 for generating the orthogonal binary basis vectors used to implement the neural network.

Some further details of components and features of the above-described apparatus 200 and device 202 will now be described.

The processing apparatuses 502, 602 may be of any suitable composition and may include one or more processors 502A, 602A of any suitable type or suitable combination of types. Indeed, the term "processing apparatus" should be understood to encompass computers having differing architectures such as single/multi-processor architectures and sequencers/parallel architectures. For example, the processing apparatus 502, 602 may be a programmable processor that interprets computer program instructions 504-2A, 604-2A and processes data. The processing apparatus 502, 602 may include plural programmable processors. Alternatively, the processing apparatus 502, 602 may be, for example, programmable hardware with embedded firmware. The processing apparatus 502, 602 may alternatively or additionally include one or more specialised circuit such as field programmable gate arrays (FPGA), Application Specific Integrated Circuits (ASICs), signal processing devices etc. In some instances, processing apparatus 502, 602 may be referred to as computing apparatus or processing means. The processing apparatuses 502, 602 may comprise one or more single or multi-core CPU, AI (Artificial Intelligence) accelerator or GPU (Graphics Processing Unit), or any combination thereof. In some examples, the processing apparatuses 502, 602 may additionally include dedicated neural network hardware for implementing neural networks, without utilising, for instance, the main CPU or GPU of the device 202/apparatus 200.

The processing apparatus 502, 602 is coupled to the memory 504, 604 and is operable to read/write data to/from the memory 504, 604. The memory 504, 604 may comprise a single memory unit or a plurality of memory units, upon which the computer readable instructions (or code) 504-2A, 604-2A is stored. For example, the memory 504, 604 may comprise both volatile memory 504-1, 604-1 and non-volatile memory 504-2, 604-2. In such examples, the computer readable instructions/program code 504-2A, 604-2A may be stored in the non-volatile memory 504-2, 604-2 and may be executed by the processing apparatus 502, 602 using the volatile memory 504-1, 604-1 for temporary storage of data or data and instructions. Examples of volatile memory include RAM (Random-access memory), DRAM (Dynamic random-access memory), and SDRAM (Synchronous dynamic random-access memory) etc. Examples of non-volatile memory include ROM (Read-only memory), PROM (Programmable read-only memory), EEPROM (Electrically erasable programmable read-only memory), flash memory, optical storage, magnetic storage, etc.

The memory 504, 604 may be referred to as one or more non-transitory computer readable memory medium or one or more storage devices. Further, the term 'memory', in addition to covering memory comprising both one or more non-volatile memory and one or more volatile memory, may also cover one or more volatile memories only, one or more non-volatile memories only. In the context of this document, a "memory" or "computer-readable medium" may be any media or means that can contain, store, communicate, propagate or transport the instructions for use by or in connection with an instruction execution system, apparatus, or device, such as a computer.

The computer readable instructions 504-2A, 604-2A may provide the logic and routines that enables the entities 200, 202 to perform the functionality described above. The combination of computer-readable instructions stored on memory (of any of the types described above) may be referred to as a computer program product. In general, references to computer program, instructions, code etc. should be understood to express software for a programmable processor firmware such as the programmable content of a hardware device as instructions for a processor or configured or configuration settings for a fixed function device, gate array, programmable logic device, etc.

The input-output interfaces 508, 608 may be any suitable type of wired or wireless (long or short range) communication interface. They may operate using any suitable type of communication protocol, including but not limited to a Bluetooth (BT) protocol, a Wi-Fi protocol, and/or a cellular communication protocol. In some examples, the apparatus 200 and/or device 202 may include multiple input output interfaces for enabling communication via various different protocols. For instance, the user device 202 may include a Bluetooth interface, a Wi-Fi interface, a cellular interface and/or any other type of input output interface via which information can be received and/or transmitted.

If desired, the different functions discussed herein may be performed in a different order and/or concurrently with each other. Furthermore, if desired, one or more of the above-described functions may be optional or may be combined.

Similarly, it will be appreciated that the device/apparatus 202, 200 illustratively depicted in FIGS. 6 and 5 and described above with reference to FIGS. 1 to 6 may comprise further elements which are not directly involved with processes and operations in respect which this application is focussed.

Although various aspects of the methods and apparatuses described herein are set out in the independent claims, other aspects may comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. Apparatus comprising:
   at least one processor; and
   at least one memory including computer program code which, when executed by the at least one processor, causes the apparatus to:
   initialize a neural network based on a set of stored model information, which defines a plurality of orthogonal binary basis vectors which are to be used to implement kernels in one or more hidden layers of the neural network, and plural sets of plural coefficients, the set of plural coefficients corresponding to a respective one of the kernels, wherein the coefficients in a given set of coefficients is associated with a respective one of the one or more orthogonal binary basis vectors, wherein the set of stored model information is selected based on one or more performance requirements, wherein the one or more performance requirements include either or both of a minimum level of accuracy for the neural network and a maximum level of computational resource use by the neural network, and wherein the maximum level of computational resource use by the neural network is dependent on a user device, or class of the user device, by which the neural network is to be implemented;
   pass input data through the neural network such that convolution operations between the kernels and data arriving at the kernels are performed, wherein the kernels are implemented using a respective set of coefficients and the orthogonal binary basis vectors with which the coefficients in the set are associated; and
   output data from the neural network, the output data representing an inference corresponding to the input data.

2. The apparatus of claim 1, wherein the computer program code, when executed, causes the apparatus to perform convolution operations between the kernels and the data arriving at the kernels by, for the kernels:
   for the binary orthogonal basis vectors associated with the coefficients corresponding to the kernel, computing a binary convolution of the orthogonal binary basis vector and the data arriving at the kernel, and multiplying the binary convolution by the coefficient associated with the orthogonal binary basis vector; and
   adding the results of the multiplications to generate an output from the kernel.

3. The apparatus of claim 1, wherein the computer program code, when executed, causes the apparatus to initialize the neural network by:
   for the kernels, using the set of coefficients corresponding to that kernel and the associated orthogonal binary basis vectors to generate the kernel.

4. The apparatus of claim 3, wherein the computer program code, when executed, causes the apparatus to, for the kernels, generate the kernel by multiplying the binary basis vector with its associated coefficient and superimposing the results of the multiplications.

5. The apparatus of claim 1, wherein the computer program code, when executed, causes the apparatus to:
   determine the one or more performance requirements for the neural network; and
   based on the one or more performance requirements, select the set of stored model information from plural sets of stored model information corresponding to a different neural network model.

6. The apparatus of claim 5, wherein the one or more performance requirements include one or more computational resource constraints associated with a device which is to execute the neural network and/or an indication of an acceptable accuracy for the neural network.

7. The apparatus of claim 6, wherein at least one of the one or more performance requirements is determined based on a current usage by the device of one or more computational resources.

8. The apparatus of claim 1, wherein the computer program code, when executed, causes the apparatus to:
   deterministically generate the orthogonal binary basis vectors required for the neural network based on identifiers in the set of stored model information.

9. The apparatus of claim 8, wherein the computer program code, when executed, causes the apparatus to deterministically generate the orthogonal binary basis vectors required for the neural network using dedicated hardware provided in a device which performs the inference.

10. The apparatus of claim 1, wherein the input data is a representation of sensor data.

11. The apparatus of claim 10, wherein the sensor data is collected by at least one sensor that is provided in, or in communication with, the device which performs the inference.

12. The apparatus of claim 10, wherein the sensor data is audio data.

13. Apparatus comprising:
    at least one processor; and
    at least one memory including computer program code which, when executed
    by the at least one processor, causes the apparatus to:
    based on determined one or more performance requirements, determine at least one set of hyperparameters, the set of hyperparameters defining a different neural network model, wherein the hyperparameters in the set include a number of layers for the neural network, a number of kernels in the layers, and a number of orthogonal binary basis vectors which are to be used to implement the kernels in the layers, wherein the one or more performance requirements include either or both of a minimum level of accuracy for the neural network and a maximum level of computational resource use by the neural network, and wherein the maximum level of computational resource use by the neural network is dependent on a user device, or class of the user device, by which the neural network is to be implemented; and
    for the set of hyperparameters:
    initialize a respective neural network based on the set of hyperparameters;
    train the neural network using training data, thereby to learn a set of plural coefficients for the kernels, wherein a coefficient is associated with a respective one of the orthogonal binary basis vectors, and wherein the kernels are implemented using a respective set of coefficients and the orthogonal binary basis vectors with which the coefficients in the set are associated; and
    store the learned coefficients in association with the hyperparameters for provision to the user device.

14. The apparatus of claim 13, wherein the computer program code, when executed, causes the apparatus to:
for the trained neural networks:
use validation data to determine whether the trained neural network satisfies the at least one constraint indicated by the one or more performance requirements; and
in response to determining that the trained neural network satisfies the at least one constraint indicated by the one or more performance requirements, provide the hyperparameters and the learned coefficients for storage on the user device.

15. The apparatus of claim 14, wherein the computer program code, when executed, causes the apparatus to:
based on the one or more performance requirements, determine plural sets of hyperparameters, the sets of hyperparameters defining a different neural network model;
initialize and train the neural networks defined by the sets of hyperparameters; and
provide plural sets of hyperparameters and corresponding learned coefficients for storage on the user device, wherein the sets of hyperparameters that are provided for storage on the user device defines a neural network that has been determined to satisfy the one or more performance requirements.

16. The apparatus of claim 14, wherein the computer program code, when executed, causes the apparatus to determine the at least one set of hyperparameters, the set of hyperparameters defining a different neural network, by:
determining, based on the one or more performance requirements, plural sets of hyperparameters, the set of hyperparameters defining a different neural network model.

17. The method of claim 13, wherein the maximum level of computational resource use by the neural network comprises one or any combination of:
central processing unit usage when executing the neural network;
latency associated with the neural network;
energy consumption resulting from executing the neural network;
memory usage when executing the neural network; and
memory usage required to store model information defining the neural network.

18. A method for performing inferencing based on input data, the method comprising:
initialize a neural network based on a set of stored model information, which defines a plurality of orthogonal binary basis vectors which are to be used to implement kernels in one or more hidden layers of the neural network, and plural sets of plural coefficients, the set of plural coefficients corresponding to a respective one of the kernels, wherein the coefficients in a given set of coefficients is associated with a respective one of the one or more orthogonal binary basis vectors, wherein the set of stored model information is selected based on one or more performance requirements, wherein the one or more performance requirements include either or both of a minimum level of accuracy for the neural network and a maximum level of computational resource use by the neural network, and wherein the maximum level of computational resource use by the neural network is dependent on a user device, or class of the user device, by which the neural network is to be implemented;
passing input data through the neural network such that convolution operations between the kernels and data arriving at the kernels are performed, wherein the kernels is implemented using a respective set of coefficients and the orthogonal binary basis vectors with which the coefficients in the set are associated; and
outputting data from the neural network, the output data representing an inference corresponding to the input data.

* * * * *